United States Patent
Ledebohm et al.

(10) Patent No.: US 7,065,630 B1
(45) Date of Patent: Jun. 20, 2006

(54) DYNAMICALLY CREATING OR REMOVING A PHYSICAL-TO-VIRTUAL ADDRESS MAPPING IN A MEMORY OF A PERIPHERAL DEVICE

(75) Inventors: Herbert O. Ledebohm, Round Rock, TX (US); Mark A. Einkauf, Austin, TX (US); Franck R. Diard, Mountain View, CA (US); Jeffrey C. Doughty, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 245 days.

(21) Appl. No.: 10/650,593

(22) Filed: Aug. 27, 2003

(51) Int. Cl.
  *G06F 12/02* (2006.01)
(52) U.S. Cl. .................. 711/206; 711/203; 711/202; 711/208; 711/170; 710/8

(58) Field of Classification Search .............. None
  See application file for complete search history.

(56) References Cited

U.S. PATENT DOCUMENTS

| | | | | |
|---|---|---|---|---|
| 5,524,202 A | * | 6/1996 | Yokohama | 707/104.1 |
| 2005/0015491 A1 | * | 1/2005 | Koeppel | 709/226 |

* cited by examiner

*Primary Examiner*—B. James Peikari
(74) *Attorney, Agent, or Firm*—Townsend and Townsend and Crew LLP

(57) ABSTRACT

Systems and methods for providing on-demand memory management. In response to a mapping request from a device driver or other program, a first portion of the memory is mapped to one or more virtual addresses in a first region of a virtual memory space so that it can be directly accessed by the CPU. In response to an unmapping request the first portion of the memory is unmapped. Mapping and unmapping requests may be made at any time.

27 Claims, 7 Drawing Sheets

DYNAMICALLY CREATING OR REMOVING A PHYSICAL-TO-VIRTUAL ADDRESS MAPPING IN A MEMORY OF A PERIPHERAL DEVICE

BACKGROUND OF THE INVENTION

The present invention relates in general to virtual memory systems and in particular to systems and methods for on-demand memory management.

Computer systems generally include various peripheral devices, such as graphics processing cards, mass storage (e.g., disk or tape) drives, printers, and so on, with which the central processing unit interacts. A device driver program that executes on the CPU is typically provided for each peripheral device; operating system and/or application programs executing on the CPU invoke functions of the driver program to interact with the peripheral device.

Many of these interactions involve accessing memory (or other addressable storage) located on the a peripheral device. For example, many computer systems include a graphics card as one peripheral device. The graphics card controls the system's display device. Typically, the graphics card includes a memory area (called a frame buffer) that stores data for individual pixels of a display device, and images are displayed by scanning out the pixel data from the frame buffer. The CPU may execute an application program that generates pixel data to be displayed and write this data directly to the frame buffer on the graphics card. As another example, commands to be executed by a graphics co-processor located on the graphics card are may be queued for execution in memory on the graphics card; the CPU can control the graphics co-processor by writing commands to this queue. Numerous other examples pertaining to graphics cards and other peripheral devices are well known.

To enable the CPU to directly access peripheral device memory, the peripheral device memory is typically mapped to a virtual memory space of the CPU. For instance, in some versions of the Microsoft Windows operating system, a 32-bit virtual address space (corresponding to 4 GB of virtual memory) is defined, and peripheral device memory is mapped to a set of virtual addresses at system startup. Mapping associates each virtual address with a specific memory location in the peripheral device, so that the CPU is able to process commands referencing a virtual address by accessing the associated location in the peripheral device memory. When peripheral device memory is not mapped to virtual memory, accessing the device memory generally requires an indirect path, in which a memory access command is transmitted to the peripheral device, which executes the command and returns an appropriate result.

In the past, virtual memory seemed inexhaustible, but for modern systems and programs, virtual memory—which is typically mapped to application and operating system program code and data on disk as well as to system memory and peripheral devices—is becoming a limited resource as the sizes of program code, system memory, and peripheral device memory are all increasing. As just one example, currently available graphics cards have as much as 256 MB of memory, and cards with 512 MB or more are on the horizon. Mapping each byte of graphics memory to a byte of virtual memory consumes a large fraction of the virtual memory, leaving less of the space available for other mappings. Depending on system configuration (e.g., size of the virtual memory space) and other parameters (e.g., virtual memory requirements of various other programs or devices and system-dependent restrictions on virtual memory use), running out of virtual memory has become a distinct possibility. Moreover, even if some virtual memory remains available, reducing the amount of free virtual memory beyond a certain point can adversely affect performance of the system.

Leaving the peripheral device memory unmapped is sometimes impractical. As noted above, direct access to the peripheral memory by the CPU requires a virtual memory mapping. While indirect access is possible without a mapping (e.g., by passing memory requests to a peripheral co-processor), indirect access paths are generally slower and may increase the load on the CPU and/or peripheral co-processors. Where frequent or fast access to peripheral device memory is required, as is usually the case with graphics cards, reliance on indirect access paths can impair system performance.

Therefore, a mechanism for enabling direct CPU access to peripheral device memory that reduces virtual memory consumption would be desirable.

BRIEF SUMMARY OF THE INVENTION

Embodiments of the present invention relate to systems and methods for providing on-demand memory management. A selected portion of the memory of a peripheral device can be mapped to virtual memory at any time in response to a request from a device driver program or other process, enabling direct CPU access to the mapped portions of the peripheral memory. Mapped portions can be unmapped on request, thereby making the virtual addresses available again for other uses. As a result, more efficient use of virtual memory is made possible.

According to one aspect of the invention, a method of managing a memory located on a peripheral device of a computing system is provided. In response to a first request, a first portion of the memory is dynamically allocated, thereby making the first portion of the memory accessible to a co-processor of the peripheral device. In response to a second request, the first portion of the memory is dynamically mapped to one or more virtual addresses in a first region of a virtual memory space, thereby making the first portion of the memory directly accessible to a process executing on a central processing unit (CPU) of the computing system. The first portion of the memory is dynamically unmappable in response to an unmapping request.

According to a further aspect of the invention, in response to a third request, a second portion of the memory is dynamically mapped to one or more virtual addresses in a second region of the virtual memory space. The first and second portions of the memory may or may not have at least one memory location in common.

In some embodiments, the virtual memory space may include a kernel space and a user space, and it is determined from the second request whether the first portion of the memory is to be mapped into the kernel space or the user space.

According to another aspect of the invention, in response to a third request that includes an allocation request and a mapping request, a second portion of the memory is allocated from a heap and is dynamically mapped to one or more virtual addresses in a second region of the virtual address space.

According to yet another aspect of the invention, the first portion of the memory is dynamically unmapped in response to an unmapping request.

The following detailed description together with the accompanying drawings will provide a better understanding of the nature and advantages of the present invention.

DETAILED DESCRIPTION OF THE INVENTION

Embodiments of the present invention relate to systems and methods for providing on-demand memory management. A selected portion of the memory of a peripheral device can be mapped to virtual memory at any time in response to a request from a device driver program or other process, enabling direct CPU access to the mapped portions of the peripheral memory. Mapped portions can be unmapped on request, thereby making the virtual addresses available again for other uses. As a result, more efficient use of virtual memory is made possible.

The following description refers to a graphics card as an example of a peripheral device, but those of ordinary skill in the art with access to the teachings of the present disclosure will recognize that the embodiments described herein are readily adaptable to other peripheral devices that have addressable memory resources to which direct CPU access is desired.

Figure 1:
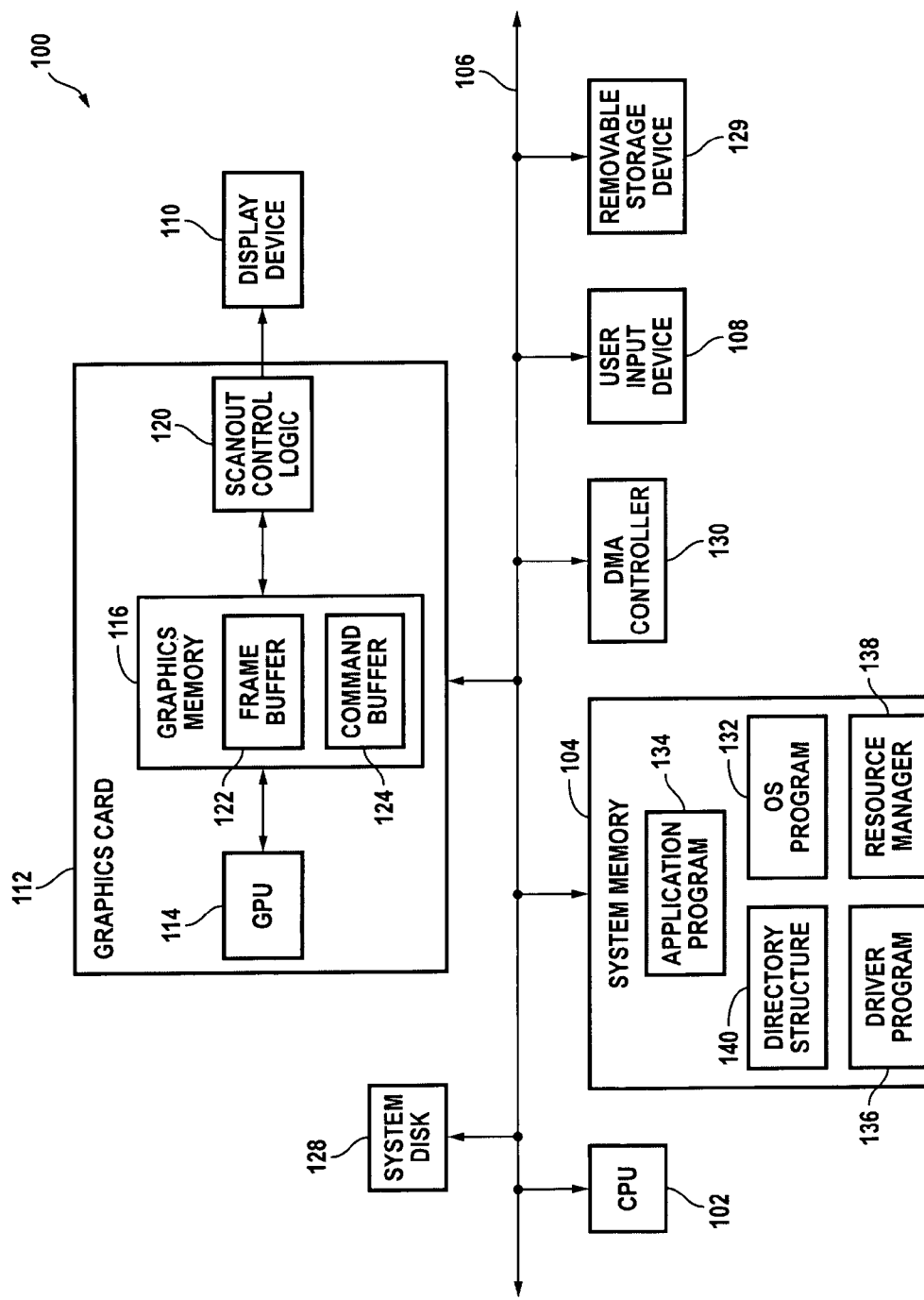
FIG. 1 is a simplified block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics card 112 coupled to system bus 106. A system disk 128 and other components, such as one or more removable storage devices 129 (e.g., floppy disk drive, compact disk (CD) drive, and/or DVD drive), may also be coupled to system bus 106.

Graphics card 112, which is an example of a peripheral device, includes a graphics processing unit (GPU) 114, a graphics memory 116, and scanout control logic 120, which may be implemented, e.g., using one or more integrated circuit devices. A memory interface 123 is provided to control access to graphics memory 116. GPU 114, which may be implemented using one or more integrated circuit devices (e.g., programmable processors or application specific integrated circuits (ASICs)), may be configured to perform various tasks, including generating pixel data from graphics data supplied via system bus 106, interacting with graphics memory 116, and the like.

Graphics memory 116 may include various physical or logical subdivisions, including a frame buffer 122 and a command buffer 124. Frame buffer 122 stores pixel data for an image that is read by scanout control logic 120 and transmitted to display device 110 for display. This pixel data may be generated from graphics data provided to GPU 114 via system bus 106 or provided directly to frame buffer 122 via system bus 106. In some embodiments, frame buffer 122 is double buffered so that while data for a first image is being read for display from a "front" buffer, data for a second image can be written to a "back" buffer without affecting the currently displayed image. Command buffer 124 is used to queue commands received via system bus 106 for execution by GPU 114. Command buffer 124 is advantageously operated as a first-in, first-out (FIFO) buffer. Other portions of graphics memory 116 may be used to store data required by GPU 114 (such as texture data, color lookup tables, and so on), executable program code for GPU 114, and so on.

Scanout control logic 120 reads pixel data from frame buffer 122 and transfers the data to display device 110 to be displayed. In one embodiment, scanout occurs at a constant refresh rate (e.g., 80 Hz); the refresh rate can be a user selectable parameter. Scanout control logic 120 may also perform other operations such as adjustment of color values, generating composite screen images by combining the pixel data in frame buffer 122 with data for a video or cursor overlay image or the like obtained from graphics memory 116 or another data source (not shown), digital to analog conversion, and so on. It will be appreciated that the particular configuration of graphics card 112 or its components is not critical to the present invention.

System 100 may also include a direct memory access (DMA) controller 130, which performs high-speed DMA transactions to transfer data between source and destination storage locations in response to instructions from CPU 102. The source and destination locations may be any physical storage locations in system 100; for example, DMA controller 130 may transfer data between different locations in system memory 104, or between system memory 104 and various peripheral storage locations such as graphics memory 116, or between two peripheral storage locations such as graphics memory 116 and system disk 128. DMA controller 130 may be of generally conventional design, implemented in one or more integrated circuit devices, and mounted on a motherboard of system 100.

In system 100, a virtual memory space is implemented using an address directory structure 140. It is to be understood that, although directory structure 140 is shown as residing in system memory 104, at any given time, portions of directory structure 140 may be swapped out, e.g., to system disk 128. In some embodiments (e.g., Microsoft Windows NT or XP), each process is provided with its own virtual memory space, a portion of which may be dedicated to shared resources such as the operating system and various device drivers. In other operating systems, the same virtual memory space is partitioned among different processes. It is to be understood that the present invention may be used with any virtual memory scheme, whether global or process-specific.

Directory structure 140 may have any desired organization. In one embodiment, CPU 102 provides 4 GB of addressable virtual memory using 32-bit addresses. The virtual memory is organized into pages, e.g., of 4 KB each. Directory structure 140 includes a page directory with 1024 entries, each referencing a page table. Each page table has 1024 entries, each of which can be associated with (e.g., contain a physical address of) a 4 KB (4096 bytes) block of physical storage, which may be located anywhere within system 100. A linear address of a byte of virtual memory can be defined by using 10 of the 32 bits to identify a page directory entry, 10 bits to identify the page table entry within the directory entry to read (thereby identifying a block of physical memory), and 12 bits to identify the offset of the memory location relative to the beginning of the block. Other addressing schemes may also be implemented; as used herein, a page corresponds to the smallest unit of virtual memory that can be mapped, and a page table entry includes any structure used to maintain an association of a page with a physical memory location.

A page of virtual memory can be mapped to a specific physical memory resource, including addressable storage locations in system main memory 104, on system disk 128, in graphics memory 116, or in any other system component. At any given time, a particular virtual memory address might or might not be mapped to a physical storage location; in some embodiments, attempts to access a virtual address fail unless the virtual address is mapped. In one embodiment, a mapping is created by modifying the content of a page table entry in directory structure 140 to include an identifier of the physical memory location. For instance, the physical memory location may be identified by specifying a base address of the device on which it resides and an offset, or any other unique identifier adapted to the architecture of system 100; appropriate physical address formats for various systems are known in the art. Numerous implementations of virtual address spaces and memory mapping are known in the art (e.g., various versions of the Microsoft Windows 98, Windows operating system), and a detailed description is omitted as not being critical to understanding the present invention.

During operation of system 100, CPU 102 executes various programs that are (temporarily) resident in system memory 104. In one embodiment, these programs include one or more operating system (OS) programs 132, one or more application programs 134, a driver program 136 for graphics card 112, and a resource manager program 138 that provides various services to driver program 136. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on chip instruction cache and/or various buffers and registers), in a page file or memory mapped file on a system disk, and/or in other storage space.

Operating system programs 132 and/or application programs 134 may be of conventional design. An application program 134 may be, for instance, a video game program that generates graphics data and invokes appropriate rendering functions of GPU 114 to transform the graphics data to pixel data. Another application program 134 may generate pixel data and provide the pixel data to graphics card 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 enables communication with graphics card 112. Driver program 136 advantageously implements one or more standard application program interfaces (APIs), such as Open GL, Microsoft DirectX, or D3D for communication with graphics card 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer graphics data or pixel data to graphics card 112 via system bus 106, to invoke various rendering functions of GPU 114, and so on. The specific commands and/or data transmitted to graphics card 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

Resource manager 138 is advantageously provided to support interactions of driver program 136 with system hardware components. Resource manager 138 implements low-level hardware and operating-specific functionality that is used by driver program 136 in processing requests from operating system programs 132 and/or application programs 134. This enables program code for driver program 136 to be written at a level of abstraction that hides details of the hardware and/or operating system on which driver program 136 is executed; thus, the same driver code can be adapted to different hardware configurations by providing a different implementation of resource manager 138. It will be appreciated that the functionality of resource manager 138 described herein might also be implemented in driver program 136, although this generally makes driver program 136 less portable.

Graphics memory 116 can be accessed by programs executing on CPU 102 via an indirect path or a direct path. In the indirect path, driver program 136 is used to queue a memory access command in command buffer 124. GPU 114 executes the command and returns an appropriate response. Since these commands are executed by GPU 114, memory locations in graphics memory 116 may be identified using a physical address (e.g., an offset) recognizable by GPU 114. In a direct access path, a command executed by CPU 102 includes a virtual memory address that is mapped to a location in graphics memory 116, enabling CPU 102 to access the location directly.

In accordance with some embodiments of the present invention, graphics memory 116 is advantageously not mapped to virtual memory at system startup or when a portion of graphics memory 116 is allocated. Instead, mapping of virtual memory to graphics memory 116 is performed on demand, i.e., in response to a specific mapping request. For instance, at various times during its operation, driver program 136 invokes an appropriate function of a resource manager 138 to allocate portions of graphics memory 116 for its own use; after allocation, driver program 136 can issue commands to GPU 114 that reference allocated memory locations. At the time of allocation, or at any subsequent time, driver program 136 may determine that an allocated portion of graphics memory 116 should be mapped to the virtual address space (e.g., to page table entries in page directory structure 140) to enable direct CPU access. Upon making such a determination, driver program 136 invokes a different function of resource manager 138 to map that portion of graphics memory 116.

Driver program 136 can also invoke an unmapping function of resource manager 138 at any time to unmap any mapped portion of graphics memory 116 to which direct access is no longer desired; any portions of graphics memory 116 that are unmapped by resource manager 138 may remain allocated (and accessible by sending commands to GPU 114) until such time as driver program 136 invokes a separate deallocation function of resource manager 138. Because portions of graphics memory 116 may be mapped and unmapped on demand and independently of allocation, the "footprint" of graphics memory 116 in virtual memory space can be significantly reduced. As will be described below, mapping and unmapping can be managed entirely by driver program 136 in conjunction with resource manager 138, thereby hiding such operations from clients of driver program 136, including operating system programs 132 and application programs 134.

It will be appreciated that system 100 is illustrative and that variations and modifications are possible. Driver and/or resource manager programs that implement on-demand memory management can be provided for a wide variety of peripheral devices, not limited to the particular graphics card 112 described above or to peripherals related to graphics and/or display functionality. The system bus connecting peripheral devices to the CPU may be implemented using various technologies, including Peripheral Component Interconnect (PCI), Small Computer System Interface (SCSI), and so on; a system may support one or more bus technologies. The virtual address space may be implemented using any organization desired and is not limited to pages of any particular size or to a page-based structure. In view of the present disclosure, persons of ordinary skill in the art will recognize that the present invention can be embodied in a wide variety of system configurations.

As mentioned above, in an embodiment of the present invention, driver program 136 invokes resource manager program 138 to dynamically map and unmap portions of graphics memory 116. Resource manager program 138 may be associated with a particular peripheral device or may be a generally available system utility.

Figure 2:
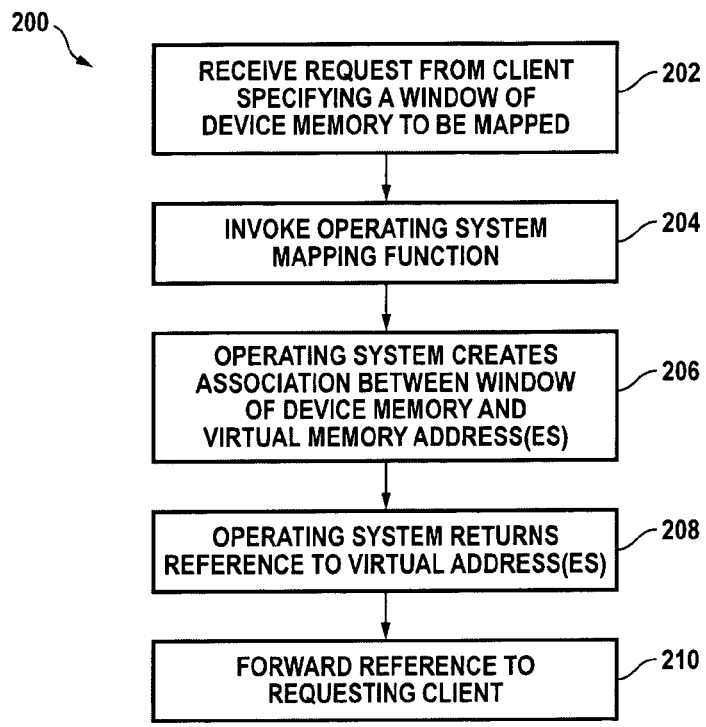
FIG. 2 is a flow diagram of a process for mapping memory according to an embodiment of the present invention.

Examples of mapping and unmapping processes that can be performed by resource manager 138 will now be described. FIG. 2 is a flow diagram of a process 200 for mapping a portion of graphics memory 116 (or any other physical memory device) to virtual memory. The portion of graphics memory 116 that is to be mapped by process 200 was previously allocated by driver program 136 (or another program executing on CPU 102); thus, the driver program has already obtained a reference to the first location to be mapped. In one embodiment, that reference is an offset (F). Allocation may be implemented using various techniques, a number of which are known in the art.

Turning to process 200, at step 202, the resource manager receives a request from a client (e.g., driver program 136 or another program executing on CPU 102) to map a portion of physical memory. In one embodiment, a contiguous group of physical memory locations (referred to herein as a "window") in graphics memory 116 is to be mapped, and the request specifies the offset (F) of the first location and the size (S) of the window to be mapped.

At step 204, the resource manager invokes an operating system function that creates an association between the specified physical locations and virtual addresses. For example, in Microsoft Windows NT/2000/XP embodiments, the VideoPortMapMemory function may be called. The function call specifies the starting location, i.e., the physical address of the first memory location in the window, and the size of the window. The resource manager may modify parameters of the received request so that they are appropriate for the operating system. For example, the requesting client may specify the starting address using only an offset F, which is insufficient for the operating system. The resource manager, which is provided with a (physical) base address B for graphics memory 116 at system startup, can combine the base address B with the offset F to determine the physical address of the starting location. As another example, where an operating system imposes size and/or alignment restrictions on mapping requests, the resource manager may adjust the size parameter S upward as needed to comply with such restrictions; in some embodiments, the operating system accepts requests of any size and makes necessary upward adjustments internally. In other embodiments, other addressing schemes may be used for identifying the physical memory locations to be mapped.

In some embodiments, the operating system function may include other parameters. For instance, the VideoPortMapMemory function includes a parameter for selecting either "user" space (a region in virtual memory that is private to a process) or "kernel" space (which is reserved for use by the operating system, device drivers, and certain other "privileged" clients). The resource manager can set this parameter based on the identity of the requesting client (e.g., user space is advantageously selected for an OpenGL driver while kernel space is advantageously selected for a DirectX driver); in an alternative embodiment, the requesting client can indicate the desired space. As another example, the VideoPortMapMemory function includes a parameter that controls whether CPU caching is used for data transfers. Selection of this parameter may be based on tradeoffs between speed (CPU caching is faster) and reliability (CPU caching is less reliable). For instance, resource managers for graphics devices may enable caching to improve speed, while resource managers for disk drives may disable it to guarantee eventual data delivery. In other embodiments, other parameters may be provided, and values may be determined by the resource manager and/or the requesting client.

At step 206, the operating system executes the function, identifying a sufficiently large section of unused virtual memory in the appropriate space (if the memory is subdivided) and associating the selected virtual memory addresses with the physical memory locations specified in the request, e.g., by modifying the content of one or more page table entries in directory structure 140. At step 208, the operating system returns a result to the resource manager. The result includes a reference (e.g., a pointer) to the first virtual memory location that was mapped and may include other information, such as error indicators. At step 210, the resource manager returns this reference to the requesting client. The requesting client can then access the mapped portion of the graphics memory by using the reference.

In an alternative embodiment, memory is mapped without using an operating system function call. Instead, the resource manager includes code that identifies unmapped memory and modifies page table entries in directory structure 140 to create the desired association.

Figure 3:
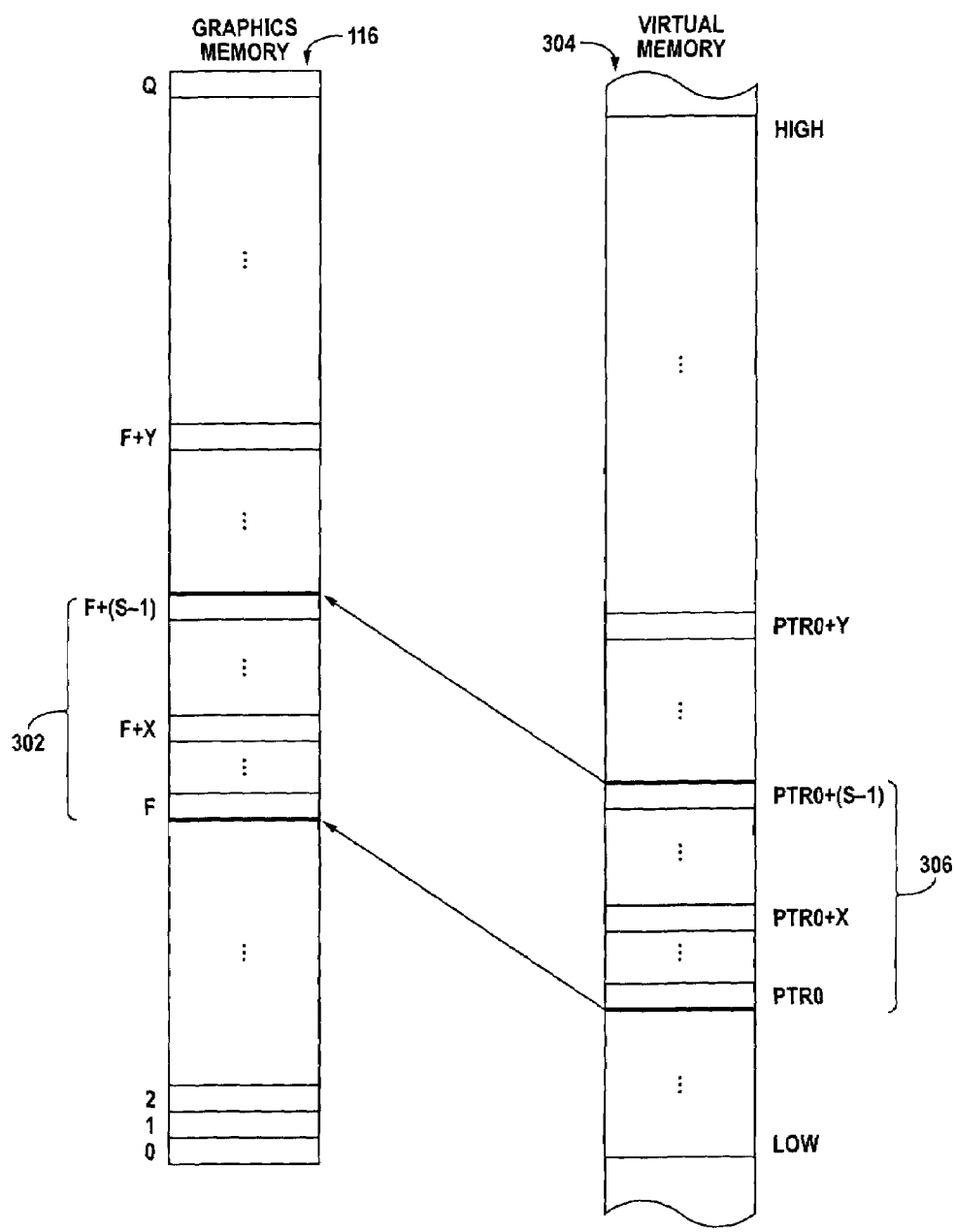
FIG. 3 is an illustration of a mapping between physical memory and virtual memory according to an embodiment of the present invention.

FIG. 3 illustrates a memory mapping established in accordance with process 200. Graphics memory 116 is represented in a linear form, with the offsets of addressable memory locations numbered from 0 to Q−1. An addressable location may correspond to a byte or any other convenient unit. A window 302 of size S in graphics memory 116 starts at a location F and ends at a location F+(S−1). A portion of a virtual memory space 304 is also represented in a linear form, with addresses from "LOW" to "HIGH." This address range may include all or any part of the entire virtual memory space. It is to be understood that graphics memory 116 may include more, fewer, or the same number of storage locations as virtual memory 304.

In accordance with process 200, a window 306 within virtual memory space 304 is mapped to window 302 of graphics memory 116. The window 306 starts at a linear address PTR0 and ends at a linear address PTR0+(S−1). It should be noted that there is no particular relationship between the starting location F of window 302 and the starting address PTR0 of window 306. Any memory location F+X, $0 \leq X \leq (S-1)$, is within window 302 and may be referenced using a virtual address PTR0+X.

Only the window 302 of graphics memory 116 is mapped to virtual memory space 304. Thus, a virtual address PTR0+Y, where Y>(S−1), is not guaranteed to be mapped to location F+Y in graphics memory 116 or to any physical memory location at all. Accordingly, program code that access graphics memory 116 using virtual addresses from window 306 is advantageously written to ensure that virtual addresses outside the range of window 306 are not accessed.

Figure 4:
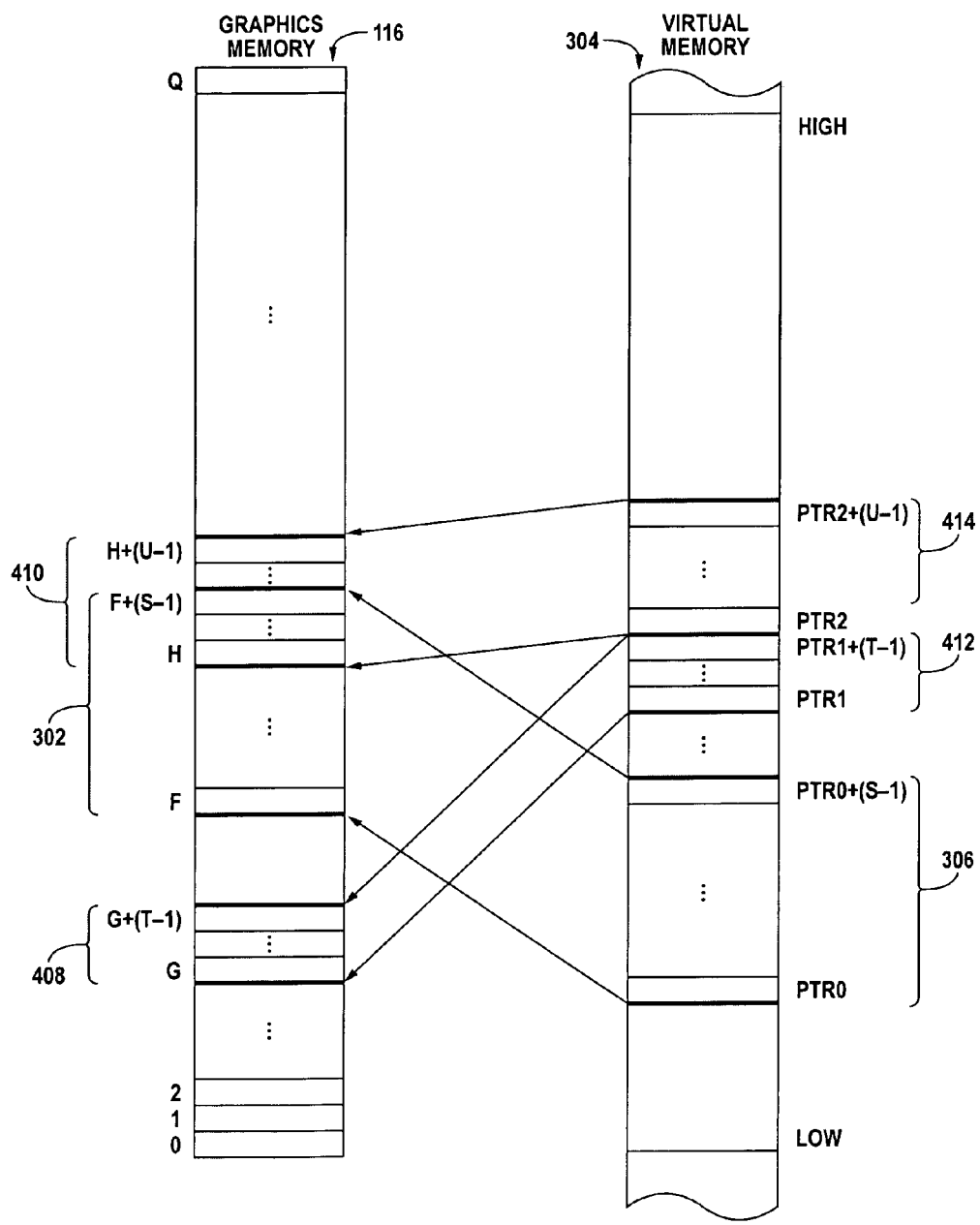
FIG. 4 is an illustration of multiple mappings between physical memory and virtual memory according to an embodiment of the present invention.

Process 200 may be invoked multiple times by the same requesting client or by different requesting clients to map multiple windows of graphics memory 116. FIG. 4 shows mappings of three windows 306, 412, 414 in virtual memory space 304 to windows 302, 408, 410 in graphics memory 116. Window 306 is mapped to window 302 as described above. Window 412 (addresses PTR1 through PTR1+(T−1)) is mapped to window 408 (locations G through G+(T−1)). Window 414 (addresses PTR2 through PTR2+(U−1)) is mapped to window 410 (locations H through H+(U−1)). Each mapping may be separately established using process 200.

As FIG. 4 shows, mappings can be independent of each other. For example, the size of each mapped region is determined based on the requested size (subject to any constraints the operating system may impose). Thus, the sizes S, T, U of the windows 306, 412, 418 may be the same or different for mappings created in response to different requests. In principle, a mapping may be as small as one addressable location (e.g., one byte) of graphics memory 116 or as large as the entire graphics memory 116. In practice, the virtual memory structure in a particular system configuration may place restrictions on the size of the mapping. For instance, if mappings are created by modifying page table entries in address directory structure 140 (FIG. 1), a mapping may be required to correspond to an integer number of pages (implying, e.g., a 4 KB minimum if the page size is 4 KB). In some instances, alignment requirements for the starting pointers (e.g., PTR0, PTR1, PTR2) may impose further restrictions on the sizes and/or locations of windows within virtual memory space 304.

Additionally, the ordering of starting locations for windows 302, 408, 410 in graphics memory 116 need not correspond to the ordering of the respective virtual memory windows 306, 412, 414. For example, in graphics memory 116, window 408 starts at an offset G that is lower than starting offset F of window 302, while in virtual memory 304, the order is reversed: PTR1 of window 412 (mapped to window 408) has a higher address than PTR0 of window 306 (mapped to window 302). Mapped windows in graphics memory 116 may also overlap, as shown by windows 302 and 410, although the windows in virtual memory 304 do not overlap. In general, no particular arrangement of the mapped windows in virtual memory 304 is required for practicing the present invention.

Figure 5:
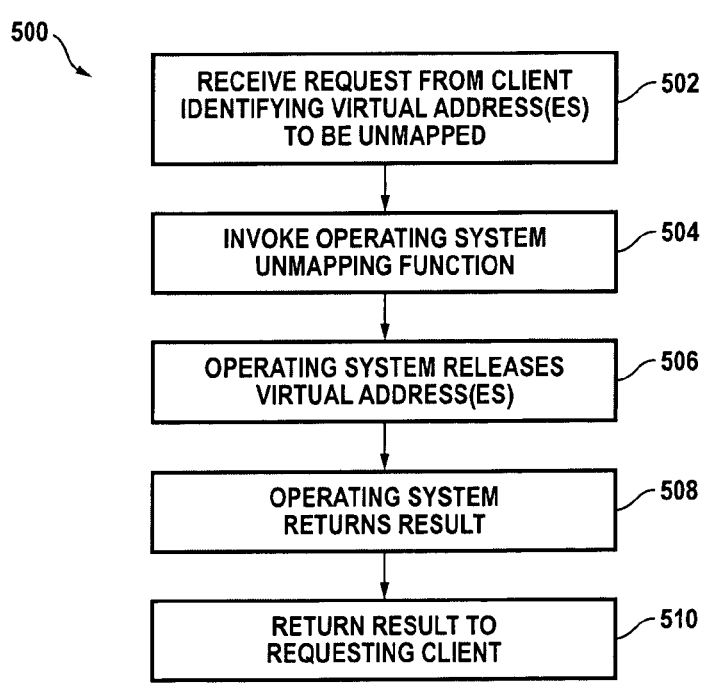
FIG. 5 is a flow diagram of a process for unmapping memory according to an embodiment of the present invention.

A window of virtual memory space 304 that is mapped in response to a client request can also be unmapped in response to a subsequent client request, thereby freeing virtual memory. FIG. 5 is a flow diagram of a process 500 for unmapping a window (e.g., window 306 of FIG. 3). Like mapping process 200 described above, unmapping process 500 may be implemented in resource manager program 138 of system 100 (FIG. 1). At step 502, the resource manager receives a request from a client to unmap memory. The request includes an identification of the virtual memory addresses to be unmapped. For instance, the request may specify the starting virtual address (e.g., PTR0) and size of a window (e.g., S) to be unmapped, or starting and ending addresses. In some embodiments, the starting virtual address (or any virtual address within the window) is sufficient to identify a window to be unmapped. At step 504, the resource manager invokes an operating system function that unmaps the identified portion of virtual memory. For instance, in Microsoft Windows NT/2000/XP, the VideoPortUnmapMemory function may be called, passing the starting virtual address of the window to be unmapped.

At step 506, the operating system executes the function, releasing the virtual addresses. Depending on the operating system, this may involve, e.g., resetting page table entries or updating status indicators to indicate that the page table entries are now free. At step 508, the operating system returns a result to the resource manager; the result may include acknowledgement or confirmation that the requested unmapping was performed successfully, an indication of error, or other information as desired. At step 510, the resource manager returns a result to the requesting client. It should be noted that process 500 does not include deallocating the memory; accordingly, after process 500 is complete, driver program 136 may continue to issue commands to GPU 114 that reference memory locations in the window using a physical address, such as the offset.

In an alternative embodiment, memory is unmapped without using an operating system function call. Instead, the resource manager includes code that performs appropriate modifications to page table entries in directory structure 140.

As an example, process 500 may be used to unmap window 306 of FIG. 3. It should be noted that this unmapping does not affect the content of graphics memory 116; any data stored in window 302 (e.g., at offset F+X) remains stored and may be accessed by reference to its physical location. The virtual address PTR0+X is no longer valid, however, and attempts to access offset F+X by reference to this virtual address will generally fail. Any other mapped windows in virtual memory space 304 (e.g., windows 412, 414 in FIG. 4) remain mapped, and their virtual addresses may continue to be used to access the corresponding physical locations in graphics memory 116. For example, in FIG. 4, if window 306 is unmapped using process 500, data stored at offset H in graphics memory 116 can no longer be accessed by reference to a virtual address within window 306; however, that data can be accessed by reference to a virtual address within window 414.

It will be appreciated that the mapping and unmapping processes described herein are illustrative and that variations and modifications are possible. Steps described as sequential may be executed in parallel, order of steps may be varied, and steps may be modified or combined. While processes 200 and 500 were described as being executed by a resource manager, they can also be implemented in other system components, such as a device driver program.

In some embodiments, the resource manager maintains a table (or other data structure) with an entry for each mapping created by process 200. The entry may include information such as the starting physical location, the starting virtual address, and the size of the mapped window. Such information can be used for various purposes, such as automatically unmapping a virtual address when the physical memory location is deallocated, verifying that an unmap request corresponds to an existing mapping, supporting re-use of mappings (as described below with reference to FIGS. 8 and 9), and so on.

In one embodiment of the present invention, a device driver program 136 advantageously invokes the on-demand mapping and unmapping functions of resource manager 138 to selectively map portions of the graphics memory 116 when direct access becomes desirable and to unmap those portions when direct access is no longer desirable. These decisions are advantageously made by driver program 136 rather than by application programs 134 or operating system programs 132. Thus, memory mapping and unmapping operations are transparent to application programs 134 and operating system programs 132.

In general, decisions on when and whether to map a portion of graphics memory 116 are advantageously based on whether direct access by the CPU is desirable. For example, in system 100 (FIG. 1), some application programs 134 may generate pixel data for an image to be displayed on display device 110. The pixel data can be stored in system main memory as a program 134 generates it, but before the image can be displayed, the data must be transferred to frame buffer 122 of graphics memory 116. It is generally more efficient to enable the application program 134 to write the pixel data directly to frame buffer 122. Accordingly, in an embodiment of the present invention, a driver program 136 would request a mapping of the frame buffer 122 to the virtual address space. Since this mapping is frequently needed, it is advantageously treated as permanent, i.e., a window of virtual memory is mapped to frame buffer 122 when frame buffer 122 is allocated (e.g., during system or driver startup) and remains mapped until it is deallocated (e.g., during system or driver shutdown).

Another permanent mapping can be advantageously defined for command buffer 124 of graphics memory 116. As described above, command buffer 124 is used to queue commands to be executed by GPU 114. A permanent mapping of command buffer 124 is advantageously provided for efficient transfer of commands. Other examples of permanent mappings that can be advantageously defined include sections of graphics memory 116 used to store cursor patterns, color lookup tables, and other data that is frequently updated by programs executing on CPU 102.

Figure 6:
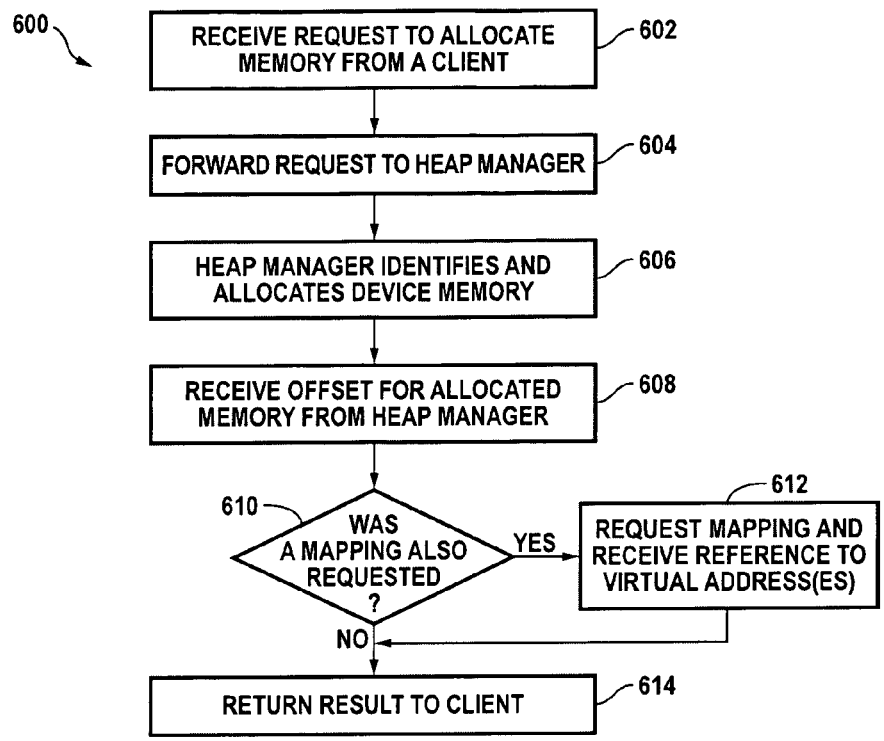
FIG. 6 is a flow diagram of a process for allocating and mapping memory according to an embodiment of the present invention.

Some embodiments of the invention facilitate permanent mappings by providing additional resource manager functions that can map physical memory to virtual memory at the time the physical memory is allocated and unmap the physical memory at the time it is deallocated. FIG. 6 is a flow diagram of a process 600 for allocating and mapping a portion of graphics memory 116. Process 600 can be invoked, e.g., by calling a memory allocation function with a parameter that indicates whether the newly allocated memory is to be mapped to the virtual address space. Any memory that is not mapped at allocation time may be mapped later, e.g., using process 200.

At step 602, the resource manager receives a request from a client (e.g., driver program 136) to allocate a portion of graphics memory 116. The request indicates the amount of memory to be allocated. At step 604, an memory allocation request is forwarded to a heap manager for graphics memory 116. The heap manager manages a pool of free memory and responds to all requests for dynamically allocating or deallocating portions of graphics memory 116. The heap manager can be implemented within resource manager 138 or a separate program executing on CPU 102. At step 606, the heap manager receives the request and allocates an appropriately sized block of memory locations in graphics memory 116. Step 606, and heap manager operations in general, can be implemented using conventional techniques.

At step 608, the resource manager receives a response from the heap manager. If the allocation was successful, the response includes the offset of the first allocated memory location. For instance, if window 302 of graphics memory 116 of FIG. 3 is allocated, the response includes the offset F. If the allocation was unsuccessful, an error indication is returned, and the resource manager takes appropriate action, such as notifying the requesting client.

At step 610, the resource manager determines whether the client's request also included a request to map the allocated memory. For instance, where the requesting client sets a parameter of the function call to indicate whether the memory should be mapped, step 610 may include checking this parameter. If a mapping was requested, then at step 612, the resource manager requests a mapping and receives a reference to a starting address (e.g., PTR0 in the embodiment of FIG. 3). The implementation of step 612 may be generally similar to process 200 described above. Whether or not a mapping was requested, at step 614, the resource manager returns a result to the requester. The result includes the physical address (e.g., offset F) of the first allocated location in graphics memory 116 and, if a mapping was requested, the starting virtual address (e.g., PTR0). If no mapping was requested, the starting virtual address may be set to a null address (which may have any designated value).

Figure 7:
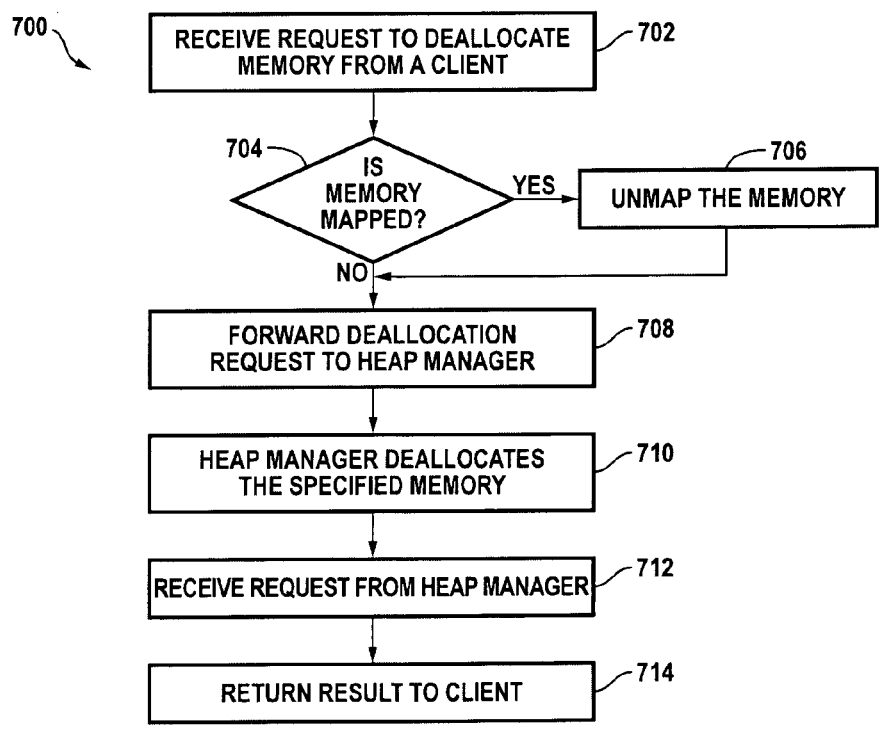
FIG. 7 is a flow diagram of a process for unmapping and deallocating memory according to an embodiment of the present invention.

FIG. 7 is a flow diagram of a corresponding process 700 for unmapping and deallocating a portion of graphics memory 116. At step 702, the resource manager receives a request to deallocate memory. In one embodiment, the request specifies the starting location of the physical memory area to be deallocated and also includes an indication of whether the memory is mapped to virtual memory. For instance, the function call that invokes process 700 may include a parameter indicating the starting virtual address, which is set to a null address if the memory is not mapped.

At step 704, it is determined whether the memory is mapped. In some embodiments, step 704 includes examining the starting virtual address parameter provided by the client. In other embodiments, the resource manager maintains its own store of information regarding portions of graphics memory 116 that have been mapped (e.g., in a lookup table or other data structure that is updated as mappings are created and destroyed), and step 704 includes accessing this information store. If it is determined that the memory is mapped, then at step 706, the resource manager unmaps the memory, e.g., in accordance with process 500.

At step 708, the deallocation request is forwarded to the heap manager, which deallocates the physical memory at step 710. Step 710 may be implemented using conventional techniques, and the heap manager may perform various tests to determine whether it is safe to deallocate the memory (e.g., whether the requester of deallocation was also the requester of allocation, whether the memory is still in use by another process, and so on). At step 712, the resource manager receives a result from the heap manager, indicating whether the deallocation was successful, and at 714, the resource manager returns a result to the client. As is known in the art, the returned result may contain any information desired, including error signals in the event of an error at any stage during process 700.

It will be appreciated that processes 600 and 700 are illustrative and that variations and modifications are possible. Steps described as sequential may be executed in parallel, order of steps may be varied, and steps may be modified or combined. In some embodiments, combined function allocation/mapping and deallocation/unmapping functions are not provided, and clients may invoke an allocation function immediately followed by a mapping function (or an unmapping function followed by a deallocation function) where appropriate. Process 700 may be used regardless of whether the memory was allocated and mapped using process 600 or some other sequence of events, and process 700 need not be used where memory was allocated and mapped by process 600. A resource manager advantageously implements processes 200 and 500 in addition to processes 600 and 700, so that memory allocation and mapping (as well as unmapping and deallocation) may be controlled independently.

It should be noted that some regions of graphics memory 116 are not directly accessed by CPU 102 and do not need to be mapped. For example, in the course of rendering an image, GPU 114 may make use of various "offscreen" buffers, such as a depth buffer, a stencil buffer, and the like that are generally hidden from application programs that invoke the rendering functions. Portions of graphics memory 116 allocated for such uses do not need to be mapped to virtual memory. As another example, graphics card 112 may be configured to perform "post-processing," in which special visual effects are applied to the pixel data before the image is displayed. For instance, GPU 114 may generate "oversampled" pixel data, in which more than one color value per display pixel is generated; post-processing can include filtering the oversampled data to compute one color value per display pixel. In many instances, data needed to create these effects may be provided to graphics memory 116 using an indirect access path (e.g., a command issued to GPU 114), so that memory mapping is not needed. Where mapping and allocation can be performed independently, as described above, a driver program 136 can allocate portions of graphics memory 116 for such uses without consuming virtual addresses.

In other cases, it may be desirable to temporarily map a portion of graphics memory 116 to perform a data transfer, then free the virtual memory for other uses by unmapping. For instance, texture data or any other data needed by GPU 114 to render an image can be transferred to a texture region of graphics memory 116 using a temporary mapping. Where unmapping the temporary mapping does not deallocate the memory, as described above, driver program 136 can continue to issue commands to GPU 114 that reference the texture region by a physical address (e.g., an offset value).

As a more complex example, suppose that graphics memory 116 contains a large texture (e.g., 200 MB) and that CPU 102 needs to write updated data into this texture. Suppose further that the size of the virtual memory space 304 is such that mapping a 200 MB texture memory area would be impractical; for instance, the available virtual memory may include fewer than 200 MB. In one embodiment of the present invention, a smaller window (or "subpartition") within the large texture can be mapped to a window of the virtual memory, enabling direct access to that subpartition. Once the data transfer for that portion of the texture is complete, the subpartition is unmapped, and the freed virtual memory is re-mapped to a different subpartition of the texture, and so on until all of the data has been transferred. In this embodiment, a lock manager is advantageously provided to coordinate the mapping, unmapping, and data transfer operations to ensure that the correct data is written to each subpartition of the texture.

Figure 8:
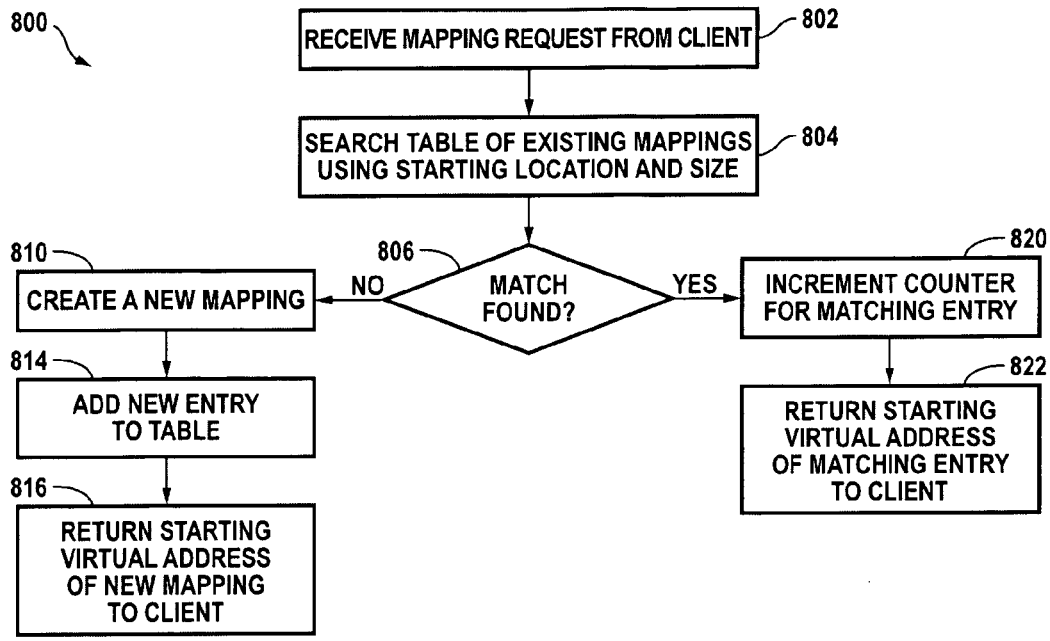
FIG. 8 is a flow diagram of a process for mapping memory according to an alternative embodiment of the present invention.

Additional reductions in demand for virtual memory space can be achieved by further optimizations. For instance, two requesting clients may each invoke process 200 to map the same window (e.g., window 302 in FIG. 3) in graphics memory 116. As a result, two windows in the virtual memory space may be mapped to the same window in the graphics memory. In one alternative embodiment, the resource manager detects a request that duplicates an existing mapping and reuses the existing mapping rather than creating a new one. FIG. 8 illustrates an embodiment of a mapping process 800 that is generally similar to process 200 but includes detection of duplicative requests. In this embodiment, the resource manager maintains a table (or other data structure) containing information about existing mappings. Each entry in the table includes the starting physical location (e.g., offset) and size of the mapped window, as well as a starting virtual address and a counter value that indicates how many processes are using the mapping. This information is used in process 800 to determine whether a request for a new mapping can be satisfied by using an existing mapping.

More specifically, at step 802, a mapping request is received, similarly to step 202 of process 200 (FIG. 2). At step 804, the table of existing mappings is searched using the starting physical location and size specified in the mapping request, and at step 806, it is determined whether a matching entry was found. If no matching entry was found, then at step 810, a new memory mapping is created, e.g., using steps 204, 206, and 208 of process 200. At step 814, the resource manager adds an entry for the new mapping to its table of mappings. The new entry includes the starting physical location and size of the mapped region, the starting virtual address, and a counter value that is initialized to 1. At step 816, the starting virtual address obtained from the operating system is returned to the requesting client, similarly to step 210 of process 200.

If, at step 806, a matching entry was found in the table, that entry is reused. More specifically, at step 820, the counter for the matching entry is incremented, indicating that an additional process is using the mapping. At step 822, the starting virtual address is retrieved from the matching entry and returned to the requesting client. The client does not need information about whether the request was satisfied by creating a new mapping or reusing an existing one.

Figure 9:
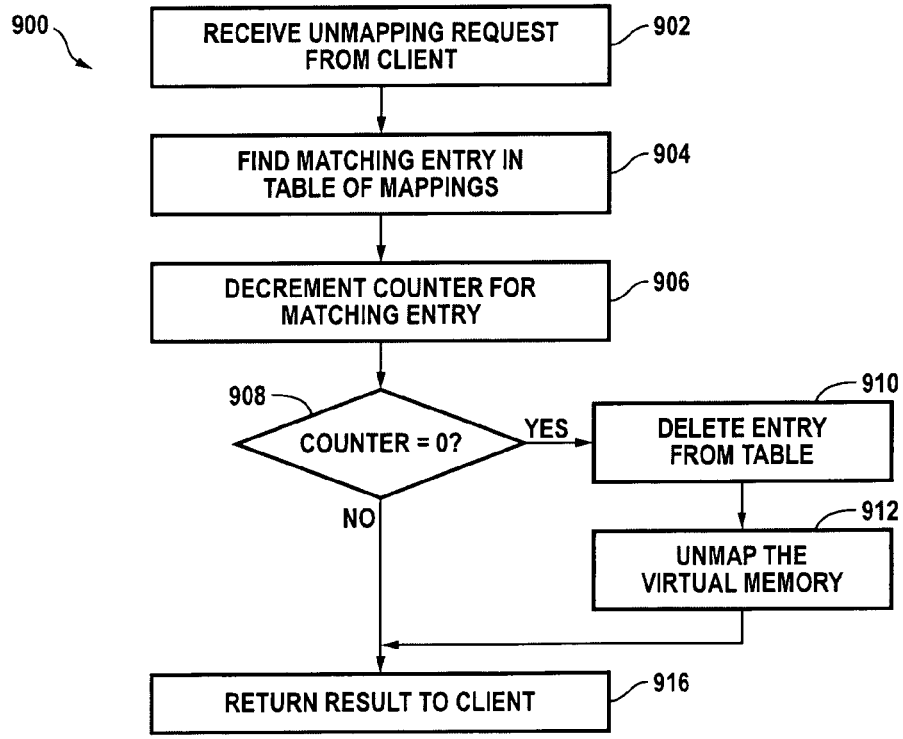
FIG. 9 is a flow diagram of a process for unmapping memory according to an alternative embodiment of the present invention.

FIG. 9 illustrates a corresponding process 900 for unmapping memory that uses the table of mappings to avoid releasing virtual memory that is still in use by a process other than the one that requested the unmapping. At step 902, an unmapping request is received from a client, similarly to step 502 of process 500 (FIG. 5). At step 904, the starting virtual address and size are used to search the table to find a matching entry. At step 906, the counter of the matching entry is decremented, indicating that one process has stopped using the mapping. At step 908, it is determined whether the counter has decremented to 0. If so, then no processes are using the mapping, and it is safe to release the virtual memory. Accordingly, at step 910, the entry is deleted from the table, and at step 912, the virtual memory is unmapped. Step 912 may be generally similar to steps 504, 506, and 508 of process 500. At step 916, a result (e.g., indicating success) is returned to the requesting client.

If, at step 908, it is determined that another process is still using the mapping, then no virtual memory is unmapped, but a result indicating success is returned to the client (step 916). The client does not need information about whether the memory was unmapped; it may simply proceed as if the virtual memory had been unmapped, e.g., later requesting that the same physical memory be mapped again.

It will be appreciated that processes 800 and 900 are illustrative and that variations and modifications are possible. Steps described as sequential may be executed in parallel, order of steps may be varied, and steps may be modified or combined. A lookup table or other data structure may be used to manage information about existing memory mappings, and other information in addition to that described above (e.g., identifiers of requesting clients) may be included in the data structure. In some embodiments, the criteria for identifying a match in process 800 may be modified to support a broader range of reuse. For instance, suppose that a first mapping covers window 302 of FIG. 3 (i.e., offsets from F to F+(S−1)) and that a second mapping is later requested for a subset of window 302 (e.g., offsets F to F+X). Since the entire region is already mapped in window 302 of virtual address space 304, that mapping can also be used to satisfy the second mapping request. Dynamically adjustable mappings may be implemented to optimize handling of overlapping requests, in which only portions of the requested physical memory regions overlap (e.g., windows 302 and 410 of FIG. 4).

Embodiments of the present invention can provide direct communication between a CPU and a peripheral device memory while significantly reducing the device's consumption of virtual memory resources. For example, in one embodiment, a graphics card includes 256 MB of memory, and the permanently mapped areas include a 3-MB frame buffer, a 3-MB command buffer (divided into a first 1-MB buffer used to control a display driver, a second 1-MB buffer for a miniport, and a third 1-MB buffer for a DirectX driver), a 256-KB bitmap cache for the display driver, plus a few bytes used for various notification data. Thus, the total mapped area is less than 7 MB, or about 2.5% of the total graphics memory. Other areas may be mapped temporarily as described above; the total amount of mapped memory at any one time can be kept below 10% of the physical memory size. It is to be understood that the reduction in virtual memory consumption does not decrease the amount of physical memory available, as any amount of memory can be allocated and used by the peripheral device without requiring a mapping. Other drivers for other peripheral devices may obtain greater or smaller reductions in virtual memory consumption, depending on particulars of the device and its operation.

Some embodiments of the invention provide further features and enhancements as well. For example, portions of the device memory that are not mapped to virtual memory are not directly accessible to the CPU or any processes executing thereon. Accordingly, selected portions of the device memory—e.g., those containing information vital to correct operation of a GPU or other co-processor—can be protected against accidental modification by preventing them from being mapped. In one embodiment, the resource manager can identify locations in the device memory as protected and reject any request to map a protected location. This can decrease the likelihood of accidentally overwriting vital data.

In other embodiments, portions of a peripheral memory may be mapped on a per-process basis. This can be used to protect process-specific data in the peripheral memory against modification by other processes. Per-process mapping of device memory can be implemented in operating systems that support process-specific virtual memory spaces, e.g., by instructing the operating system to map into a process-specific subspace of the virtual memory.

In yet another embodiment, commands sent to the GPU or other peripheral co-processor may be modified to use virtual addresses rather than physical addresses. This may reduce the size of addresses within the peripheral device. For instance, suppose that 32 bits are required to specify a physical address in a peripheral device memory. With on-demand mapping, the number of bits can be reduced (e.g., to 16), at the price of making a smaller window of the device memory available at a given time.

Figure 10:
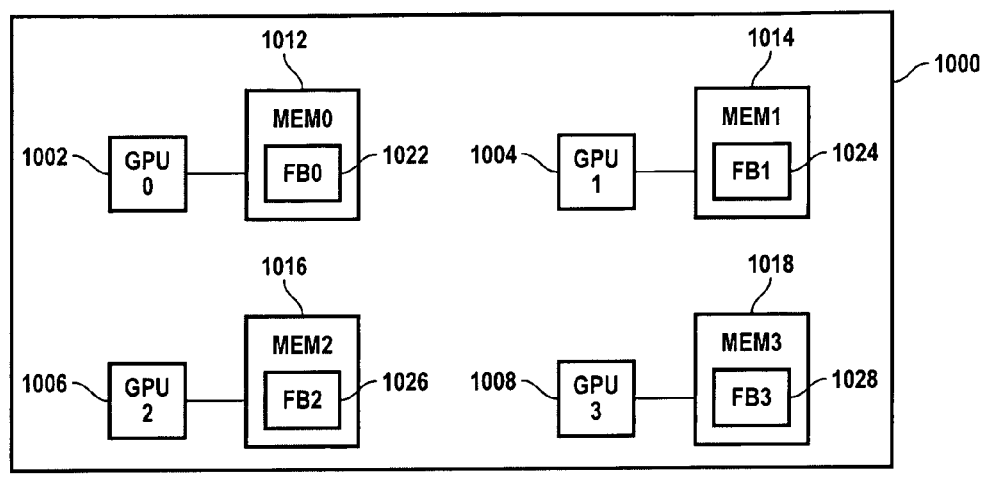
FIG. 10 is a simplified block diagram of a graphics card with multiple processors.

In still other embodiments, contiguous addresses in virtual memory may be mapped to non-contiguous physical memory locations. This can be useful, e.g., to hide a peripheral device's physical memory organization from processes executing on CPU 102. By way of illustration, FIG. 10 is a simplified block diagram of an embodiment of a multi-processor graphics card 1000 that includes four GPUs 1002, 1004, 1006, 1008. Each GPU has an associated graphics memory 1012, 1014, 1016, 1018, and each memory includes a respective frame buffer 1022, 1024, 1026, 1028. Each GPU-memory pair (1002/1012, 1004/1014, 1006/1016, 1008/1018) is associated a different portion of a display area, and pixel data for each portion of the display is obtained from the appropriate one of the four frame buffers 1022, 1024, 1026, 1028. Graphics memories 1012, 1014, 1016, 1018 are implemented as four separate memory devices, so that frame buffers 1022, 1024, 1026, 1028 are at non-contiguous addresses.

Figure 11:
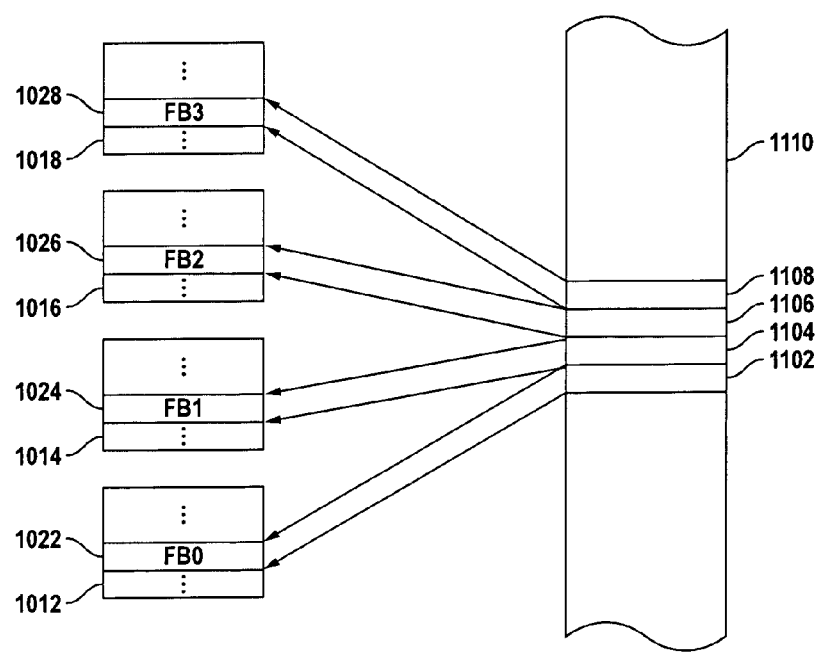
FIG. 11 is an illustration of a mapping between physical memory and virtual memory according to an embodiment of the present invention.

FIG. 11 illustrates a mapping that hides the physical organization of the graphics card's memory from processes executing on the CPU. The four non-contiguous frame buffers 1022, 1024, 1026, 1028 are mapped to contiguous blocks 1102, 1104, 1106, 1108 in virtual memory 1110. Since the mapping is done on demand, these frame buffer definitions can be changed as needed; there is no need to determine the mappings at initialization time and preserve them unmodified. This provides greater flexibility to adapt to changing conditions.

In addition, in some embodiments, the same virtual address can be mapped to multiple physical memory locations of a peripheral device. In the embodiment of FIG. 10, for instance, a virtual address can be mapped to a corresponding physical location in each of the four graphics memories 1012, 1014, 1016, 1018. This mapping supports a "broadcast" mode for memory transactions, in which a single direct-access command (e.g., write) from the CPU results in multiple operations in the graphics memory (e.g., data is written to four different locations). Implementation of one-to-many mapping may include providing a bridge chip (not shown) in graphics card 1000; the virtual address maps to the bridge chip, which distributes the data to the appropriate set of physical locations. The broadcast mode allows further reduction in the amount of virtual memory space required by the graphics card, and the ability to change mappings dynamically provides greater flexibility.

While the invention has been described with respect to specific embodiments, one skilled in the art will recognize that numerous modifications are possible. For instance, on-demand memory management has been described in the context of mapping portions of a graphics memory. Those of ordinary skill in the art will recognize that similar techniques can be applied to mapping any other type of physical memory or addressable storage resource, including system memory, memory associated with peripheral devices, mass storage devices such as disk drives, memory associated with an accelerated graphics port (AGP) or other chipset components, hardware-based network processing stacks, on-chip caches or other addressable storage locations of particular CPUs in a multi-CPU system, and so on. The techniques described herein can be applied in a wide variety of hardware architectures and operating systems.

In embodiments described above, pointers or other addresses were used as examples of memory references, but other formats may be used. For instance, memory allocations and mappings can be object based. When device memory is allocated, it is associated with a unique handle supplied by the client. Once the memory is successfully allocated, all pertinent information about that memory (size, memory type, cache type, etc.) is associated with the unique handle. The handle is then used to identify that memory object in function other calls that utilize it. In particular, a client requesting a memory mapping identifies the memory by its handle, and the mapping information (including a virtual address) is associated with the handle. Persons of ordinary skill in the art will recognize that object based memory handles can provide numerous advantages.

When the pool of virtual memory available to a device is insufficient to meet the demand for mappings, a "recycling" technique may be implemented. A resource manager for a peripheral device can be configured to permanently reserve a portion of the virtual address space (e.g., a range of page table entries) at system startup and to use addresses in that range to serve requests as they come in, mapping and unmapping as needed. When insufficient virtual memory is available to satisfy a new request, mappings that have not been used recently can be released and used to satisfy the new request.

Driver and/or resource manager programs incorporating various features of the present invention may be encoded on various computer readable media for storage transmission; suitable media include magnetic disk or tape, optical storage media such as compact disk (CD) or DVD (digital versatile disk), flash memory, and carrier signals adapted for transmission via wired, optical, and/or wireless networks including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method of managing a memory located on a peripheral device of a computing system, the method comprising:
    in response to a first request, dynamically allocating a first portion of the memory, thereby making the first portion of the memory accessible to a co-processor of the peripheral device;
    in response to a second request, dynamically mapping the first portion of the memory to one or more virtual addresses in a first region of a virtual memory space, thereby making the first portion of the memory directly accessible to a process executing on a central processing unit (CPU) of the computing system,
    wherein the first portion of the memory is dynamically unmappable in response to an unmapping request.

2. The method of claim 1, wherein the first and second requests are generated by a driver program for the peripheral device.

3. The method of claim 1, wherein the second request occurs at a time other than during system initialization.

4. The method of claim 1, wherein the peripheral device includes a graphics card.

5. The method of claim 4, wherein the first portion of the memory corresponds to a frame buffer for storing pixel data of an image.

6. The method of claim 4, wherein the first portion of the memory corresponds to a command buffer for queuing commands to be executed by a graphics co-processor located on the graphics card.

7. The method of claim 1, further comprising:
    in response to a third request, dynamically mapping a second portion of the memory to one or more virtual addresses in a second region of the virtual memory space.

8. The method of claim 7, wherein the first and second portions of the memory have at least one memory location in common.

9. The method of claim 8, wherein the first and second regions of the virtual memory space do not have any virtual addresses in common.

10. The method of claim 7, wherein the first and second portions of the memory are non-contiguous and the first and second regions of the virtual memory space are contiguous.

11. The method of claim 1, further comprising:
    in response to the second request, modifying one or more page table entries to establish an association between the one or more virtual address and a location in the first portion of the memory.

12. The method of claim 1, wherein the virtual memory space includes a kernel space and a user space.

13. The method of claim 12, wherein the first region of the virtual memory space is in the kernel space.

14. The method of claim 12, wherein the first region of the virtual memory space is in the user space.

15. The method of claim 12, further comprising:
    prior to the act of dynamically mapping the first portion of the memory, determining from the second request whether the first portion of the memory is to be mapped into the kernel space or the user space.

16. The method of claim 1, further comprising:
    in response to a third request that includes an allocation request and a mapping request:
    allocating a second portion of the memory from a heap; and
    after allocating the second portion of the memory, dynamically mapping the memory to one or more virtual addresses in a second region of the virtual address space.

17. The method of claim 1, further comprising:
    in response to a third request, dynamically unmapping the first portion of the memory.

18. The method of claim 17, further comprising:
    in response to the second request, modifying one or more page table entries to establish an association between the one or more virtual address and a location in the first portion of the physical memory; and in response to the third request, modifying the one or more page table entries such that the one or more virtual addresses are no longer associated with the locations.

19. The method of claim 17, wherein the third request is generated by a driver program for the peripheral device.

20. The method of claim 17, wherein the third request includes a deallocation request, the method further comprising:

in response to the third request, deallocating the first portion of the memory, thereby returning the first portion of the memory to a heap, wherein deallocation occurs after the act of unmapping the first portion of the memory.

21. The method of claim 1, further comprising:

in response to a third request, the third request being a request to map a second portion of the memory:

determining whether the second portion of the memory matches the first portion of the memory;

in the event that the second portion of the memory matches the first portion of the memory, reusing the mapping of the first portion of the memory to satisfy the third request; and in the event that the second portion of the memory does not match the first portion of the memory, mapping the second portion of the memory to one or more virtual addresses in a second region of the virtual memory space.

22. The method of claim 21, wherein the second portion of the memory matches the first portion of the memory in the event that every location within the second portion of the memory is also within the first portion of the memory.

23. A computer program product comprising:

a tangible computer readable medium encoded with program code, the program code including:

program code for generating an allocation request;

program code for responding to the allocation request by dynamically allocating a first portion of a memory of a peripheral device, thereby making the first portion of the memory accessible to a co-processor of the peripheral device;

program code for generating a mapping request;

program code for responding to the mapping request by dynamically mapping the first portion of the memory to one or more virtual addresses in a first region of a virtual memory space, thereby making the first portion of the memory directly accessible to a process executing on a central processing unit (CPU) of a computing system;

program code for generating an unmapping request; and program code for responding to the unmapping request by unmapping the portion of the memory, thereby making the portion of memory no longer accessible to the process.

24. The computer program product of claim 23, wherein the computer readable medium comprises a magnetic storage medium encoded with the program code.

25. The computer program product of claim 23, wherein the computer readable medium comprises an optical storage medium encoded with the program code.

26. The computer program product of claim 23, wherein the computer readable medium comprises a carrier signal encoded with the program code and adapted for transmission via a network.

27. A product for use with a computing system, the product comprising:

a peripheral device adapted to be installed in the computing system; and a computer readable medium encoded with driver program code for a driver of the peripheral device, the driver program code including:

program code for generating an allocation request;

program code for responding to the allocation request by dynamically allocating a first portion of a memory of a peripheral device, thereby making the first portion of the memory accessible to a co-processor of the peripheral device;

program code for generating a mapping request;

program code for responding to the mapping request by dynamically mapping the first portion of the memory to one or more virtual addresses in a first region of a virtual memory space, thereby making the first portion of the memory directly accessible to a process executing on a central processing unit (CPU) of the computing system;

program code for generating an unmapping request; and program code for responding to the unmapping request by unmapping the portion of the memory, thereby making the portion of memory no longer accessible to the process.

* * * * *